(12) United States Patent
Wu et al.

(10) Patent No.: US 10,412,714 B2
(45) Date of Patent: Sep. 10, 2019

(54) CHANNEL SENDING METHOD AND APPARATUS, AND CHANNEL RECEIVING METHOD AND APPARATUS

(71) Applicant: Huawei Technologies Co., Ltd., Shenzhen (CN)

(72) Inventors: Huifang Wu, Shenzhen (CN); Yueying Zhao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 15/664,958

(22) Filed: Jul. 31, 2017

(65) Prior Publication Data

US 2017/0332366 A1    Nov. 16, 2017

Related U.S. Application Data

(63) Continuation of application No. PCT/CN2015/071803, filed on Jan. 29, 2015.

(51) Int. Cl.
*H04W 72/04* (2009.01)
*H04W 28/04* (2009.01)
(Continued)

(52) U.S. Cl.
CPC .......... *H04W 72/0406* (2013.01); *H04L 1/08* (2013.01); *H04W 28/04* (2013.01);
(Continued)

(58) Field of Classification Search
CPC .......... H04W 72/0406; H04W 52/325; H04W 28/04; H04L 1/08
See application file for complete search history.

(56) References Cited

U.S. PATENT DOCUMENTS

2003/0103481 A1*  6/2003  Heo .................. H04L 1/0003
                                                         370/335
2016/0081065 A1    3/2016  Shi et al.
(Continued)

FOREIGN PATENT DOCUMENTS

CN        101500259 A  *  8/2009
CN        101500259 A      8/2009
(Continued)

OTHER PUBLICATIONS

NSN, Nokia., "Data Channel Coverage Enhancement", 3GPP TSG RAN 1 #75, San Francisco, USA, R1-135576, Nov. 11-15, 2013, XP050735241, 4 pages.
(Continued)

*Primary Examiner* — Vinncelas Louis
(74) *Attorney, Agent, or Firm* — Conley Rose, P.C.

(57) ABSTRACT

A channel sending method and apparatus, and a channel receiving method and apparatus relate to the communications field, where the sending method includes separately setting a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel, sending the control channel according to the repetition quantity and the sending start time of the control channel, and sending the data channel according to the repetition quantity and the sending start time of the data channel. Hence, the sending method can save transmit power and resolve a problem of a lag of data channel demodulation.

20 Claims, 8 Drawing Sheets

(51) Int. Cl.
*H04W 52/32* (2009.01)
*H04L 1/08* (2006.01)
*H04L 1/18* (2006.01)

(52) U.S. Cl.
CPC ............ *H04W 52/325* (2013.01); *H04L 1/18* (2013.01); *Y02D 70/00* (2018.01)

(56) References Cited

U.S. PATENT DOCUMENTS

| | | |
|---|---|---|
| 2016/0183231 A1 | 6/2016 | Shi et al. |
| 2016/0242203 A1* | 8/2016 | You .................. H04W 4/70 |
| 2017/0094649 A1 | 3/2017 | Shi et al. |

FOREIGN PATENT DOCUMENTS

| | | |
|---|---|---|
| CN | 103929266 A | 7/2014 |
| CN | 104202828 A | 12/2014 |
| WO | 2014170230 A2 | 10/2014 |
| WO | 2014170230 A3 | 10/2014 |
| WO | 2014173185 A1 | 10/2014 |

OTHER PUBLICATIONS

Foreign Communication From a Counterpart Application, European Application No. 15879369.5, Extended European Search Report dated Dec. 19, 2017, 10 pages.

Machine Translation and Abstract of Chinese Publication No. CN101500259, Aug. 5, 2009, 14 pages.

Foreign Communication From a Counterpart Application, PCT Application No. PCT/CN2015/071803, English Translation of International Search Report dated Nov. 6, 2015, 2 pages.

Foreign Communication From a Counterpart Application, PCT Application No. PCT/CN2015/071803, English Translation of Written Opinion dated Nov. 6, 2015, 6 pages.

ZTE,"Discussion on Traffic Channel Coverage Improvement," R1-135362, 3GPP TSG RAN WG1 Meeting #75, Nov. 11-15, 2013, 6 pages.

LG Electronics,"UL channel transmission for MTC coverage enhancement" R1-140308, 3GPP TSG RAN WG1 #76. Feb. 10-14, 2014, 5 pages.

Foreign Communication From a Counterpart Application, Japanese Application No. 2017-540266, Japanese Office Action dated Sep. 4, 2018, 9 pages.

Foreign Communication From a Counterpart Application, Japanese Application No. 2017-540266, English Translation of Japanese Office Action dated Sep. 4, 2018, 10 pages.

Foreign Communication From a Counterpart Application, Japanese Application No. 2017-540266, Japanese Notice of Allowance dated Dec. 11, 2018, 3 pages.

Foreign Communication From a Counterpart Application, Chinese Application No. 201580019499.3, Chinese Office Action dated Nov. 26, 2018, 8 pages.

* cited by examiner

| Control channel | Data channel 1 |
|---|---|
| Control channel | Data channel 1 |
| Control channel | Data channel 1 |
| Control channel | Data channel 1 |
| Control channel | Data channel 1 |
| Control channel | Data channel 1 |
| Control channel | Data channel 1 |
| Control channel | Data channel 1 |
| Control channel 1 | Data channel |
| Control channel 1 | Data channel |
| Control channel 1 | Data channel |
| Control channel 1 | Data channel |
| Control channel 1 | Data channel |
| Control channel 1 | Data channel |
| Control channel 1 | Data channel | t2 t1

CHANNEL SENDING METHOD AND APPARATUS, AND CHANNEL RECEIVING METHOD AND APPARATUS

CROSS-REFERENCE TO RELATED APPLICATIONS

This application is a continuation of International Patent Application No. PCT/CN2015/071803 filed on Jan. 29, 2015, which is hereby incorporated by reference in its entirety.

TECHNICAL FIELD

The present disclosure relates to the communications field, and in particular, to a channel sending method and apparatus, and a channel receiving method and apparatus.

BACKGROUND

A project of small data transmission (SDT) is successfully established in R13. One important task of the project is to provide super long range coverage. To enhance the coverage, a relatively intuitive method is that a transmit end performs retransmission, and a receive end combines signals in order to increase a requirement on the coverage.

Currently, in a retransmission method, a data channel and a control channel are sent simultaneously according to a same repetition quantity. However, actually, a coverage requirement of the data channel is different from that of the control channel, and transmitting the two channels according to the same repetition quantity probably causes waste of transmit power, and results in a lag of data demodulation.

SUMMARY

To save transmit power, resolve a problem of a lag of data channel demodulation, and to flexibly set repetition quantities of a data channel and a control channel, embodiments of the present disclosure provide a channel sending method and apparatus, and a channel receiving method and apparatus. The technical solutions are as follows.

According to a first aspect, a channel sending method is provided, where the method includes separately setting a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel, sending the control channel according to the repetition quantity and the sending start time of the control channel, and sending the data channel according to the repetition quantity and the sending start time of the data channel.

With reference to the first aspect, in a first possible implementation manner of the first aspect, the repetition quantity of the control channel is less than the repetition quantity of the data channel and the sending start time of the control channel is equal to the sending start time of the data channel, and at the sending start time of the control channel, the control channel is sent according to preset transmit power of the control channel and the repetition quantity of the control channel, and the data channel is sent according to preset transmit power of the data channel and the repetition quantity of the control channel.

With reference to the first possible implementation manner of the first aspect, in a second possible implementation manner of the first aspect, after the control channel is completely sent, the data channel is sent according to a remaining repetition quantity of the data channel and the preset transmit power of the data channel, where the remaining repetition quantity of the data channel is equal to a difference value between the repetition quantity of the data channel and the repetition quantity of the control channel, or the data channel is sent according to the remaining repetition quantity of the data channel and preset transmit power of user equipment (UE) after the control channel is completely sent, where the preset transmit power of the UE is equal to a sum of the preset transmit power of the data channel and the preset transmit power of the control channel.

With reference to the first aspect, in a third possible implementation manner of the first aspect, the sending start time of the control channel is earlier than the sending start time of the data channel, sending the control channel according to the repetition quantity and the sending start time of the control channel, and sending the data channel according to the repetition quantity and the sending start time of the data channel includes sending the control channel according to preset transmit power of the control channel and the repetition quantity of the control channel at the sending start time of the control channel, and sending the data channel according to preset transmit power of the data channel and the repetition quantity of the data channel at the sending start time of the data channel.

With reference to the third possible implementation manner of the first aspect, in a fourth possible implementation manner of the first aspect, a time difference between the sending start time of the control channel and the sending start time of the data channel is greater than or equal to the repetition quantity of transmission time intervals (TTIs) of the control channel.

With reference to the first aspect, in a fifth possible implementation manner of the first aspect, the sending start time of the control channel is earlier than the sending start time of the data channel, and a time difference between the sending start time of the control channel and the sending start time of the data channel is greater than or equal to the repetition quantity of TTIs of the control channel, and sending the control channel according to the repetition quantity and the sending start time of the control channel, and sending the data channel according to the repetition quantity and the sending start time of the data channel includes sending the control channel according to preset transmit power of UE and the repetition quantity of the control channel at the sending start time of the control channel, and sending the data channel according to the preset transmit power of the UE and the repetition quantity of the data channel at the sending start time of the data channel.

According to a second aspect, a channel receiving method is provided, where the method includes obtaining, by a receive end, a repetition quantity and a receiving start time of a control channel, and a repetition quantity and a receiving start time of a data channel, where the repetition quantity of the control channel is less than the repetition quantity of the data channel or the receiving start time of the control channel is earlier than the receiving start time of the data channel, and receiving the control channel according to the repetition quantity and the receiving start time of the control channel, and receiving the data channel according to the repetition quantity and the receiving start time of the data channel.

With reference to the second aspect, in a first possible implementation manner of the second aspect, a time difference between the receiving start time of the control channel and the receiving start time of the data channel is greater than or equal to the repetition quantity of TTIs of the control channel.

According to a third aspect, a channel sending apparatus is provided, where the apparatus includes a setting module configured to separately set a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel, and a sending module configured to send the control channel according to the repetition quantity and the sending start time of the control channel, and send the data channel according to the repetition quantity and the sending start time of the data channel.

With reference to the third aspect, in a first possible implementation manner of the third aspect, the repetition quantity of the control channel is less than the repetition quantity of the data channel and the sending start time of the control channel is equal to the sending start time of the data channel, and the setting module is configured to send the control channel according to preset transmit power of the control channel and the repetition quantity of the control channel at the sending start time of the control channel, and send the data channel according to preset transmit power of the data channel and the repetition quantity of the control channel.

With reference to the first possible implementation manner of the third aspect, in a second possible implementation manner of the third aspect, the setting module is further configured to send the data channel according to a remaining repetition quantity of the data channel and the preset transmit power of the data channel after completely sending the control channel, where the remaining repetition quantity of the data channel is equal to a difference value between the repetition quantity of the data channel and the repetition quantity of the control channel, or send the data channel according to the remaining repetition quantity of the data channel and preset transmit power of UE after completely sending the control channel, where the preset transmit power of the UE is equal to a sum of the preset transmit power of the data channel and the preset transmit power of the control channel.

With reference to the third aspect, in a third possible implementation manner of the third aspect, the sending start time of the control channel is earlier than the sending start time of the data channel, and the sending module is configured to send the control channel according to preset transmit power of the control channel and the repetition quantity of the control channel at the sending start time of the control channel, and send the data channel according to preset transmit power of the data channel and the repetition quantity of the data channel at the sending start time of the data channel.

With reference to the third possible implementation manner of the third aspect, in a fourth possible implementation manner of the third aspect, a time difference between the sending start time of the control channel and the sending start time of the data channel is greater than or equal to the repetition quantity of TTIs of the control channel.

With reference to the third aspect, in a fifth possible implementation manner of the third aspect, the sending start time of the control channel is earlier than the sending start time of the data channel, and a time difference between the sending start time of the control channel and the sending start time of the data channel is greater than or equal to the repetition quantity of TTIs of the control channel, and the sending module is configured to send the control channel according to preset transmit power of UE and the repetition quantity of the control channel at the sending start time of the control channel, and send the data channel according to the preset transmit power of the UE and the repetition quantity of the data channel at the sending start time of the data channel.

According to a fourth aspect, a channel receiving apparatus is provided, where the apparatus includes an obtaining module configured to obtain a repetition quantity and a receiving start time of a control channel, and a repetition quantity and a receiving start time of a data channel, where the repetition quantity of the control channel is less than the repetition quantity of the data channel or the receiving start time of the control channel is earlier than the receiving start time of the data channel, and a receiving module configured to receive the control channel according to the repetition quantity and the receiving start time of the control channel, and receive the data channel according to the repetition quantity and the receiving start time of the data channel.

With reference to the fourth aspect, in a first possible implementation manner of the fourth aspect, a time difference between the receiving start time of the control channel and the receiving start time of the data channel is greater than or equal to the repetition quantity of TTIs of the control channel.

In the embodiments of the present disclosure, because a repetition quantity of a control channel is less than a repetition quantity of a data channel or a sending start time of a control channel is equal to a sending start time of a data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, the control channel and the data channel are transmitted according to different repetition quantities in order to save transmit power when coverage requirements of the two channels are different.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
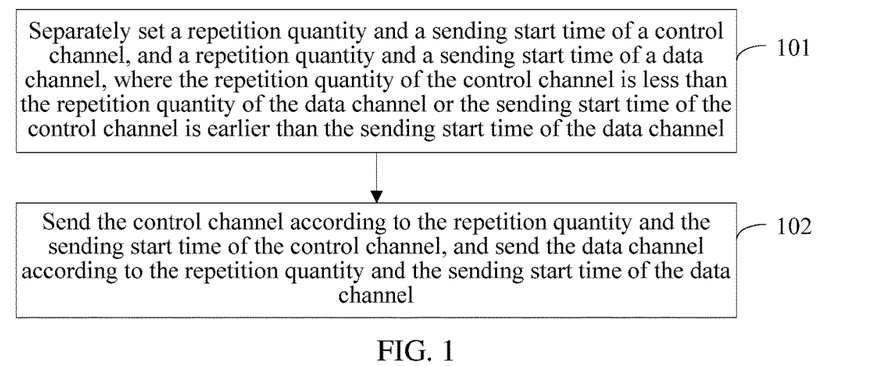
FIG. 1 is a flowchart of a channel sending method according to Embodiment 1 of the prevent disclosure.

Referring to FIG. 1, this embodiment of the present disclosure provides a channel sending method, including the following steps.

Step 101: Separately set a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel.

Step 102: Send the control channel according to the repetition quantity and the sending start time of the control channel, and send the data channel according to the repetition quantity and the sending start time of the data channel.

In this embodiment of the present disclosure, because a repetition quantity of a control channel is less than a repetition quantity of a data channel or a sending start time of a control channel is equal to a sending start time of a data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, the control channel and the data channel are transmitted according to different repetition quantities in order to save transmit power when coverage requirements of the two channels are different.

Embodiment 2

Figure 2A:
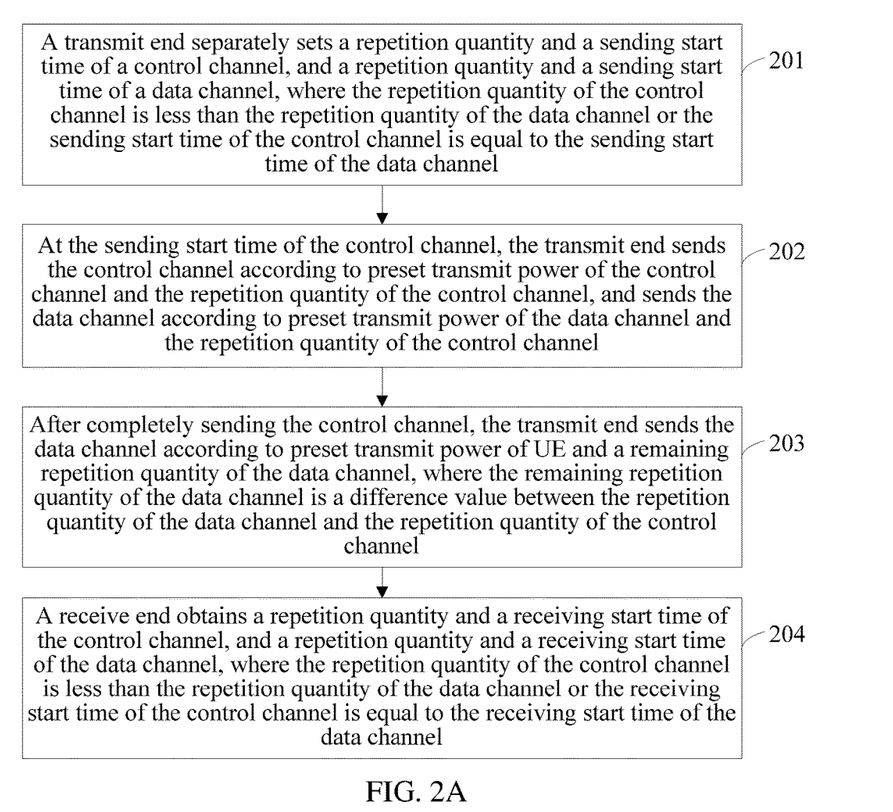
FIG. 2A is a flowchart of a channel sending method according to Embodiment 2 of the prevent disclosure.

This embodiment of the present disclosure provides a channel sending method. In this embodiment of the present disclosure, a control channel and a data channel may be sent simultaneously, but a repetition quantity of the control channel is less than a repetition quantity of the data channel. Referring to FIG. 2A, the method includes the following steps.

Step 201: A transmit end separately sets a repetition quantity and a sending start time of the control channel, and a repetition quantity and a sending start time of the data channel, where the repetition quantity of the control channel is less than the repetition quantity of the data channel or the sending start time of the control channel is equal to the sending start time of the data channel.

The data channel is used to carry data that needs to be sent by the transmit end, and the control channel is used to carry control information that is needed to demodulate the data channel. To enhance coverage, the transmit end needs to repeatedly send the control channel and the data channel to a receive end for many times. Because coverage requirements of the control channel and the data channel are different, to obtain the control information as soon as possible, in general, the repetition quantity of the control channel being less than the repetition quantity of the data channel may be set in this step, but this step is not limited to the repetition quantity of the control channel being less than the repetition quantity of the data channel.

Before this step is performed, the transmit end and the receive end may agree on the repetition quantity of the control channel and the repetition quantity of the data channel in advance. Therefore, in this step, the receive end may directly obtain the repetition quantity of the control channel and the repetition quantity of the data channel that are agreed with the transmit end.

A legacy timing continues to be used for the sending start time of the control channel and the data channel. Using the uplink as an example, the sending start time of the control channel and the data channel is 1024 chips after a downlink dedicated physical control channel (DPCCH).

Step 202: At the sending start time of the control channel, the transmit end sends the control channel according to preset transmit power of the control channel and the repetition quantity of the control channel, and sends the data channel according to preset transmit power of the data channel and the repetition quantity of the control channel.

A sum of the preset transmit power of the control channel and the preset transmit power of the data channel is equal to preset transmit power of UE. The preset transmit power of the UE is total power that is used to send the control channel and the data channel and that is defined in the transmit end in advance.

Figure 2B:
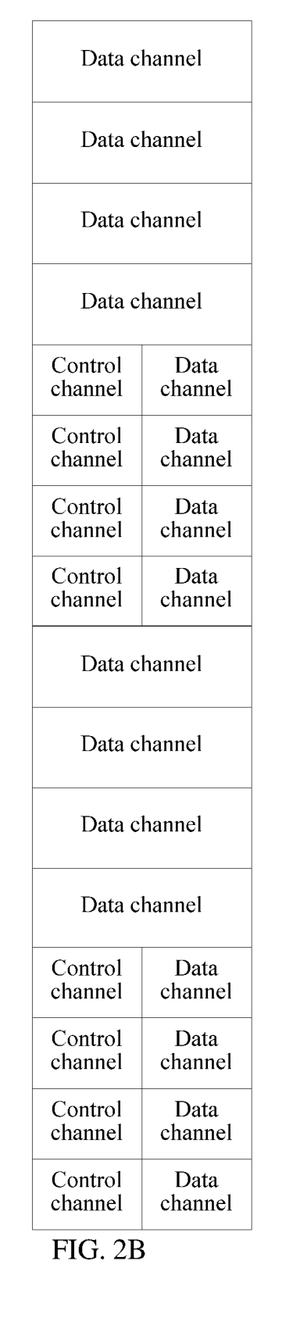
FIG. 2B is a first schematic diagram of a channel sending process according to Embodiment 2 of the prevent disclosure.

The transmit end sends the control channel and the data channel once within one TTI. Because the sending start time of the control channel is the same as the sending start time of the data channel, the transmit end sends the control channel and the data channel simultaneously within the repetition quantity of TTIs of the control channel For example, it is assumed that the preset transmit power of the UE is 5, the preset transmit power of the control channel is 2, and the preset transmit power of the data channel is 3. It is assumed that, in step 201, the repetition quantity and the sending start time of the control channel are set to 4 and t, and the repetition quantity and the sending start time of the data channel are set to 8 and t respectively. Referring to FIG. 2B, at the sending start time t, according to the preset transmit power 2 of the control channel and the repetition quantity 4 of the control channel, the control channel are sent separately within four TTIs, and according to the preset transmit power 3 of the data channel and the repetition quantity 4 of the control channel, the data channel are sent separately within the four TTIs.

Step 203: After completely sending the control channel, the transmit end sends the data channel according to preset transmit power of UE and a remaining repetition quantity of the data channel, where the remaining repetition quantity of the data channel is a difference value between the repetition quantity of the data channel and the repetition quantity of the control channel.

Because the repetition quantity of the control channel is less than the repetition quantity of the data channel, the control channel is completely sent before the sending of the data channel is completed. After the control channel is completely sent, the data channel may be sent according to the preset transmit power of the control channel, that is, the data channel may be sent according to the preset transmit power of the UE, increasing transmit power of the data channel in order to reduce the repetition quantity of the data channel, and achieve an effect of saving the transmit power.

For example, the repetition quantity of the control channel is 4 and the repetition quantity of the data channel is 8, and therefore, the remaining repetition quantity of the data channel is 4. Referring to FIG. 2B, after completely sending the control channel, the transmit end sends the data channel separately within four TTIs according to the remaining repetition quantity of the data channel and the preset transmit power 5 of the UE.

Figure 2C:
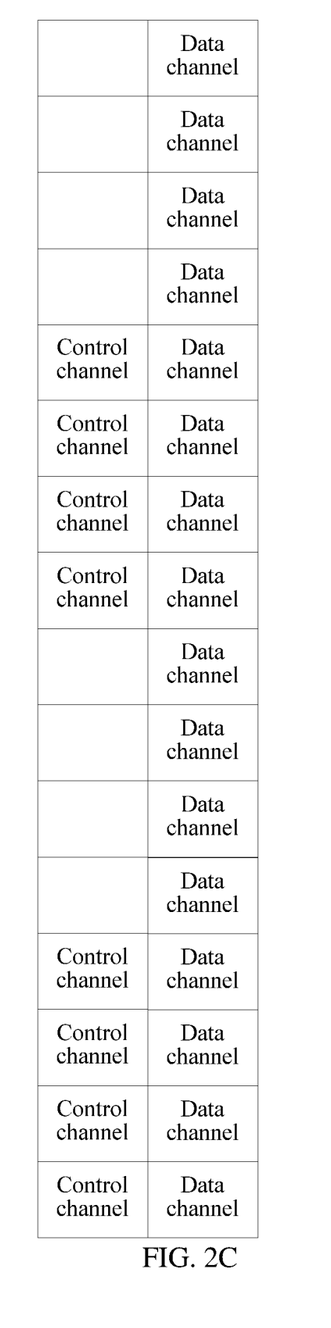
FIG. 2C is a second schematic diagram of the channel sending process according to Embodiment 2 of the prevent disclosure.

Further, in this embodiment, after completely sending the control channel, the transmit end may also continue sending the data channel according to the preset transmit power of the data channel and the remaining repetition quantity of the data channel. For example, referring to FIG. 2C, after completely sending the control channel, the transmit end also continues sending the data channel according to the preset transmit power 3 of a data channel and the remaining repetition quantity 4 of the data channel.

Step 204: A receive end obtains a repetition quantity and a receiving start time of the control channel, and a repetition quantity and a receiving start time of the data channel, where the repetition quantity of the control channel is less than the repetition quantity of the data channel or the receiving start time of the control channel is equal to the receiving start time of the data channel.

The transmit end and the receive end may agree on the repetition quantity of the control channel and the repetition quantity of the data channel in advance. Therefore, the receive end may obtain the repetition quantity of the control channel and the repetition quantity of the data channel according to the agreement that is made with the transmit end.

A legacy timing continues to be used for the receiving start time of the control channel and the data channel. Using uplink as an example, the receive end uses sending start time of the uplink as the receiving start time of the control channel, or may be in a receiving state after network synchronization and constantly receive the control channel and the data channel.

Further, the method may include the following step (not shown).

Step 205: The receive end receives the control channel according to the repetition quantity and the sending start time of the control channel, and receives the data channel according to the repetition quantity and the sending start time of the data channel.

Because the control channel is completely sent before the sending of the data channel is completed, the receive end may first demodulate the control channel to obtain control information of the control channel. In this case, the control information carried in the control channel is already obtained by means of demodulation when the data channel is demodulated such that the control information does not need to be waited for, and the data channel may be directly demodulated, thereby resolving a problem of a lag of the data channel demodulation.

In this embodiment of the present disclosure, because a repetition quantity of a control channel is less than a repetition quantity of a data channel and a sending start time of the control channel is equal to a sending start time of the data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, after the control channel is completely sent, the data channel may be sent according to preset transmit power of UE in order to reduce the repetition quantity of the data channel, thereby reducing transmit power.

Embodiment 3

Figure 3A:
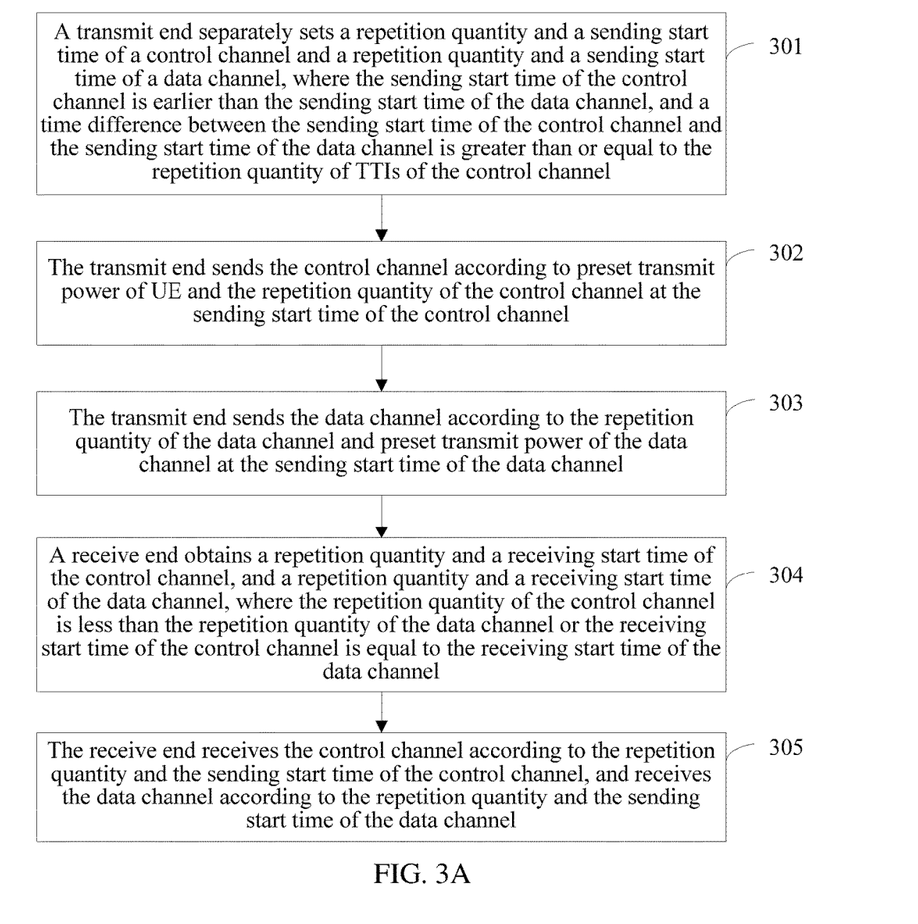
FIG. 3A is a flowchart of a channel sending method according to Embodiment 3 of the prevent disclosure.

This embodiment of the present disclosure provides a channel sending method. In this embodiment of the present disclosure, a control channel is sent before a data channel is sent, and the control channel and the data channel may be separately sent according to preset transmit power of UE. Referring to FIG. 3A, the method includes the following steps.

Step 301: A transmit end separately sets a repetition quantity and a sending start time of the control channel and a repetition quantity and a sending start time of the data channel, where the sending start time of the control channel is earlier than the sending start time of the data channel, and a time difference between the sending start time of the control channel and the sending start time of the data channel is greater than or equal to the repetition quantity of TTIs of the control channel.

The data channel is used to carry data that needs to be sent by the transmit end, and the control channel is used to carry control information that is needed to demodulate the data channel. To enhance coverage, the transmit end needs to repeatedly send the control channel and the data channel to a receive end for many times. Because coverage requirements of the control channel and the data channel are different, to obtain the control information as soon as possible, in general, the repetition quantity of the control channel being less than the repetition quantity of the data channel may be set in this step, but this step is not limited to the repetition quantity of the control channel being less than the repetition quantity of the data channel.

Before this step is performed, the transmit end and the receive end may agree on the repetition quantity of the control channel and the repetition quantity of the data channel in advance, and a quantity of preset TTIs between the sending start time of the control channel and the sending start time of the data channel, where the quantity of preset TTIs is greater than or equal to the repetition quantity of the control channel.

In this step, the transmit end may directly obtain the repetition quantity of the control channel and the repetition quantity of the data channel that are agreed with the receive end in advance. A legacy timing continues to be used for the sending start time of the control channel. Using uplink as an example, the sending start time of the control channel is 1024 chips after a downlink DPCCH. The sending start time of the data channel is calculated according to the preset quantity of TTIs and the sending start time of the control channel.

Step 302: The transmit end sends the control channel according to the preset transmit power of the UE and the repetition quantity of the control channel at the sending start time of the control channel.

The preset transmit power of the UE is total power that is used to send the control channel and the data channel and that is defined in the transmit end in advance. The control channel and the data channel are sent once by the transmit end within one TTI. In this step, the transmit end sends the control channel to the receive end separately within the repetition quantity of TTIs of the control channel according to the preset transmit power of the UE.

Figure 3B:
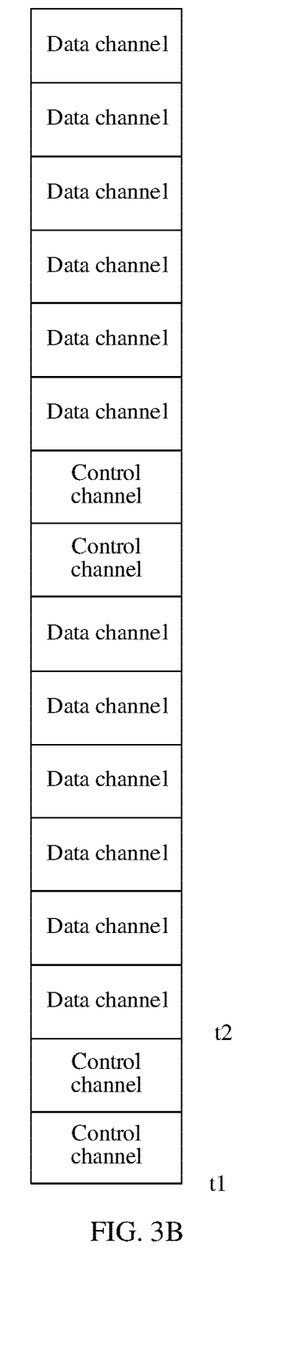
FIG. 3B is a first schematic diagram of a channel sending process according to Embodiment 3 of the prevent disclosure.

For example, it is assumed that the preset transmit power of the UE is 5, and in step 301, the repetition quantity and the sending start time of the control channel are set to 2 and $t_1$ respectively, and the repetition quantity and the sending start time of the data channel are set to 6 and $t_2$ respectively. In this case, the time difference between the sending start time $t_2$ and the sending start time $t_1$ is greater than or equal to two TTIs. Referring to FIG. 3B, when the time difference between the sending start time $t_2$ and the sending start time $t_1$ is equal to the two TTIs, at the sending start time $t_1$, the control channel is sent separately within the two TTIs according to the preset transmit power 5 of UE and the repetition quantity 2 of the control channel. Alternatively, referring to FIG. 3B, when the time difference between the sending start time $t_2$ and the sending start time $t_1$ is greater than the two TTIs, at the sending start time $t_1$, the control channel is sent separately within the two TTIs according to the preset transmit power 5 of UE and the repetition quantity 2 of the control channel.

Step 303: The transmit end sends the data channel according to the repetition quantity of the data channel and preset transmit power of the data channel at the sending start time of the data channel.

Figure 3C:
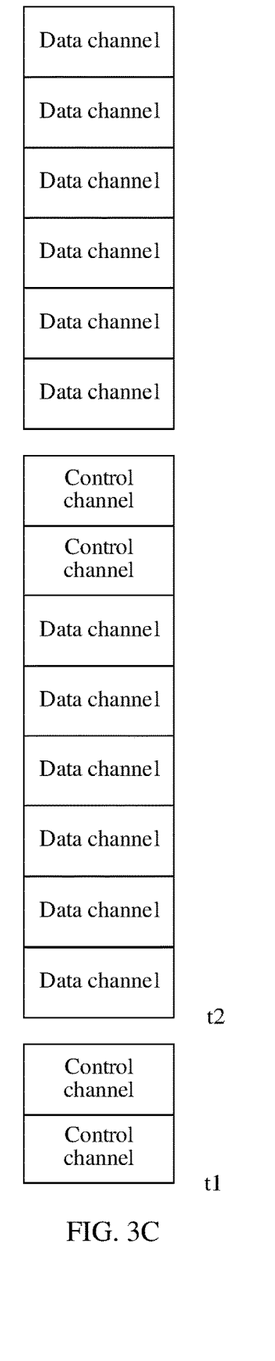
FIG. 3C is a second schematic diagram of the channel sending process according to Embodiment 3 of the prevent disclosure.

For example, the repetition quantity of the data channel is 6, and referring to FIGS. 3B and 3C, when the sending start time of the data channel is $t_1$, the data channel is sent separately within six TTIs according to the repetition quantity 6 of the data channel and the preset transmit power 5 of the UE.

Step 304: A receive end obtains a repetition quantity and a receiving start time of the control channel, and a repetition quantity and a receiving start time of the data channel, where the repetition quantity of the control channel is less than the repetition quantity of the data channel or the receiving start time of the control channel is equal to the receiving start time of the data channel.

The transmit end and the receive end may agree on the repetition quantity of the control channel and the repetition quantity of the data channel in advance. Therefore, the receive end may obtain the repetition quantity of the control channel and the repetition quantity of the data channel according to the agreement that is made with the transmit end.

A legacy timing continues to be used for the receiving start time of the control channel. Using uplink as an example, the receive end uses sending start time of the uplink as the receiving start time of the control channel, and calculates the sending start time of the data channel according to the preset quantity of TTIs and the sending start time of the control channel, or may be still in a receiving state, and receive the control channel and the data channel at any time.

Step 305: The receive end receives the control channel according to the repetition quantity and the sending start time of the control channel, and receives the data channel according to the repetition quantity and the sending start time of the data channel.

Because the sending start time of the control channel is earlier than the sending start time of the data channel and the time difference between the sending start time of the control channel and the sending start time of the data channel is greater than or equal to the repetition quantity of TTIs of the control channel, the control channel is sent before the data channel is sent, and the data channel is sent after the control channel is completely sent. In this way, the receive end may first demodulate the control channel to obtain control information carried in the control channel such that the control information carried in the control channel is already obtained by means of demodulation when the data channel is demodulated in order to resolve a problem of a lag of the data channel demodulation.

In this embodiment of the present disclosure, because a repetition quantity of a control channel is less than a repetition quantity of a data channel and a sending start time of the control channel is earlier than a sending start time of the data channel, some transmit power is saved, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation.

Embodiment 4

Figure 4A:
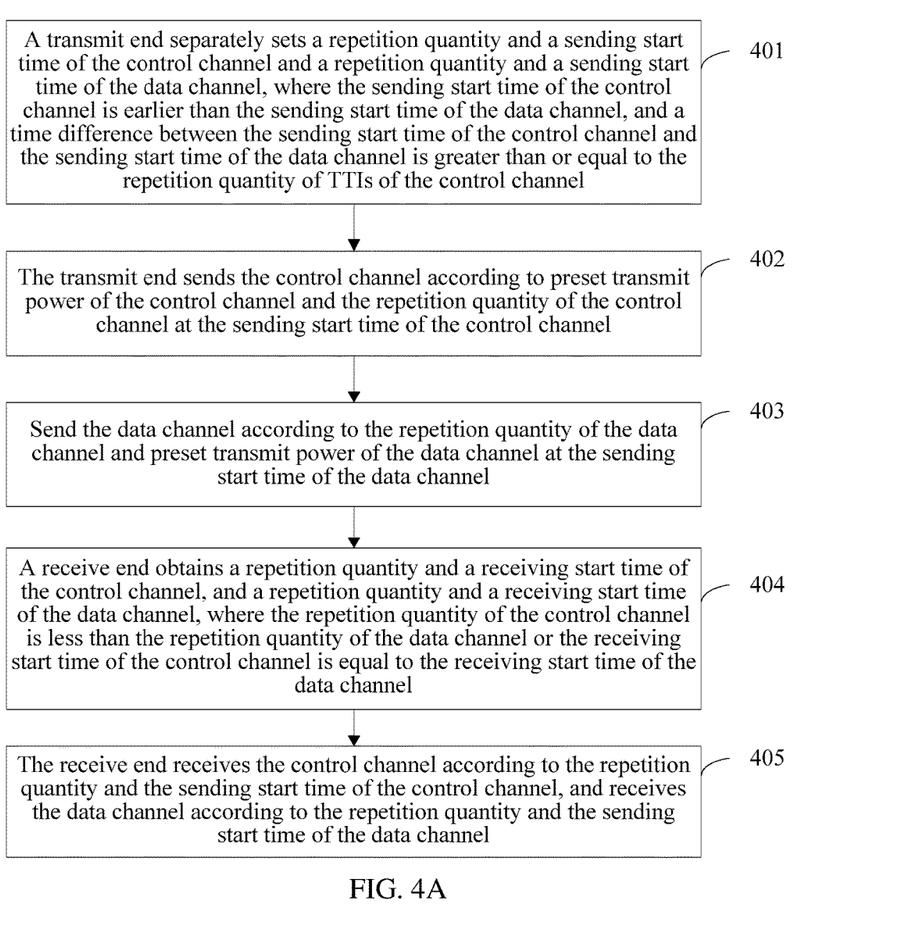
FIG. 4A is a flowchart of a channel sending method according to Embodiment 4 of the prevent disclosure.

This embodiment of the present disclosure provides a channel sending method. In this embodiment of the present disclosure, a control channel is sent before a data channel is sent, the control channel is sent according to preset transmit power of the control channel, and the data channel is sent according to preset transmit power of the data channel. A sum of the preset transmit power of the control channel and the preset transmit power of the data channel is equal to preset transmit power. Referring to FIG. 4A, the method includes the following steps.

Step 401: A transmit end separately sets a repetition quantity and a sending start time of the control channel and a repetition quantity and a sending start time of the data channel, where the sending start time of the control channel is earlier than the sending start time of the data channel, and a time difference between the sending start time of the control channel and the sending start time of the data channel is greater than or equal to the repetition quantity of TTIs of the control channel.

The data channel is used to carry data that needs to be sent by the transmit end, and the control channel is used to carry control information that is needed to demodulate the data channel. To enhance coverage, the transmit end needs to repeatedly send the control channel and the data channel to a receive end for many times. Because coverage requirements of the control channel and the data channel are different, to obtain the control information as soon as possible, in general, the repetition quantity of the control channel being less than the repetition quantity of the data channel may be set in this step, but this step is not limited to the repetition quantity of the control channel being less than the repetition quantity of the data channel.

Before this step is performed, the transmit end and the receive end may agree on the repetition quantity of the control channel and the repetition quantity of the data channel in advance, and a quantity of preset TTIs between the sending start time of the control channel and the sending start time of the data channel, where the quantity of preset TTIs is greater than or equal to the repetition quantity of the control channel.

In this step, the transmit end may directly obtain the repetition quantity of the control channel and the repetition quantity of the data channel that are agreed with the receive end in advance. Before sending the control channel and the data channel, the transmit end sends a notification message to the receive end.

A legacy timing continues to be used for the sending start time of the control channel. Using uplink as an example, the sending start time of the control channel is 1024 chips after a downlink DPCCH. The sending start time of the data channel is calculated according to the preset quantity of TTIs and the sending start time of the control channel.

Step 402: The transmit end sends the control channel according to the preset transmit power of the control channel and the repetition quantity of the control channel at the sending start time of the control channel.

The control channel and the data channel are sent once by the transmit end within one TTI. In this step, the transmit end sends the control channel to the receive end separately within the repetition quantity of TTIs of the control channel according to the preset transmit power of the control channel.

The transmit end sends another data channel according to the preset transmit power of the data channel and the repetition quantity of the data channel at the sending start time of the control channel. Sending of a control channel corresponding to the other data channel is completed before the sending start time.

Figure 4B:
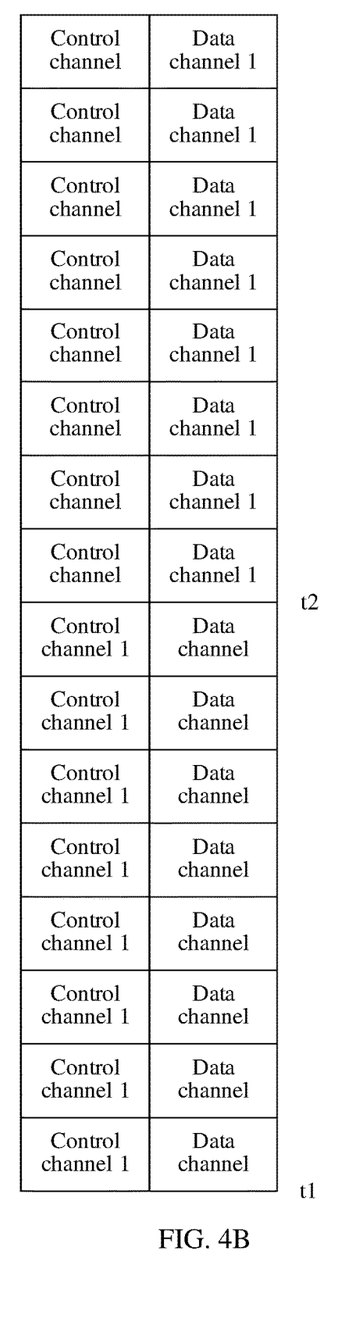
FIG. 4B is a schematic diagram of a channel sending process according to Embodiment 4 of the prevent disclosure.

For example, it is assumed that preset transmit power of UE is 5, the preset transmit power that is allocated for the control channel in advance is 2, and the preset transmit power that is allocated for the data channel is 3. It is assumed that, in step 401, the repetition quantity and the sending start time of the control channel are set to 8 and $t_1$ respectively, and the repetition quantity and the sending start time of the data channel are set to 8 and $t_2$ respectively. In this case, the time difference between the sending start time $t_2$ and the sending start time $t_1$ is greater than or equal to eight TTIs. Referring to FIG. 4B, at the sending start time $t_1$, according to the preset transmit power 2 of the control channel and the repetition quantity 8 of the control channel, a control channel 1 is sent separately within the eight TTIs. At the sending start time $t_1$, according to the preset transmit power 3 of the data channel and the repetition quantity 8 of the data channel, a data channel 2 corresponding to another control channel is sent separately within the eight TTIs.

Step 403: Send the data channel according to the repetition quantity of the data channel and preset transmit power of the data channel at the sending start time of the data channel.

Further, at the sending start time of the data channel, the control channel corresponding to the other data channel may also be sent according to the repetition quantity of the control channel and the preset transmit power of the control channel.

For example, the repetition quantity of the data channel is 8, and referring to FIG. 4B, at the sending start time $t_2$ of the data channel, the data channel is sent separately within the eight TTIs according to the repetition quantity 8 of the data channel and the preset transmit power 3 of the data channel. At the sending start time $t_2$ of the data channel, the control channel corresponding to the other data channel may also be sent according to the repetition quantity 8 of the control channel and the preset transmit power 2 of the control channel separately within the eight TTIs.

Step 404: A receive end obtains a repetition quantity and a receiving start time of the control channel, and a repetition quantity and a receiving start time of the data channel, where the repetition quantity of the control channel is less than the repetition quantity of the data channel or the receiving start time of the control channel is equal to the receiving start time of the data channel.

The transmit end and the receive end may agree on the repetition quantity of the control channel and the repetition quantity of the data channel in advance. Therefore, the receive end may obtain the repetition quantity of the control channel and the repetition quantity of the data channel according to the agreement that is made with the transmit end.

A legacy timing continues to be used for the receiving start time of the control channel. Using uplink as an example, the receive end uses sending start time of the uplink as the receiving start time of the control channel, and calculates the sending start time of the data channel according to the preset quantity of TTIs and the sending start time of the control channel, or may be still in a receiving state, and receive the control channel and the data channel at any time.

Step 405: The receive end receives the control channel according to the repetition quantity and the sending start time of the control channel, and receives the data channel according to the repetition quantity and the sending start time of the data channel.

In this embodiment of the present disclosure, because a sending start time of a control channel is earlier than a sending start time of a data channel and a time difference between a sending start time of a control channel and a sending start time of the data channel is greater than or equal to a repetition quantity of TTIs of the control channel, the control channel is sent before the data channel is sent, and the data channel is sent after the control channel is completely sent. In this way, a receive end may first demodulate the control channel to obtain control information carried in the control channel such that the control information carried in the control channel is already obtained by means of demodulation when the data channel is demodulated in order to resolve a problem of a lag of the data channel demodulation.

Embodiment 5

Figure 5:
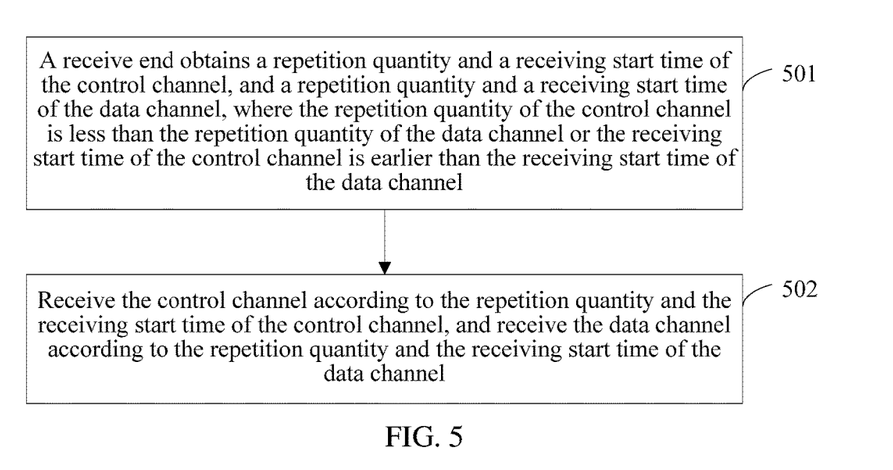
FIG. 5 is a flowchart of a channel receiving method according to Embodiment 5 of the prevent disclosure.

Referring to FIG. 5, this embodiment of the present disclosure provides a channel receiving method, including the following steps.

Step 501: A receive end obtains a repetition quantity and a receiving start time of the control channel, and a repetition quantity and a receiving start time of the data channel, where the repetition quantity of the control channel is less than the repetition quantity of the data channel or the receiving start time of the control channel is earlier than the receiving start time of the data channel.

Step 502: Receive the control channel according to the repetition quantity and the receiving start time of the control channel, and receive the data channel according to the repetition quantity and the receiving start time of the data channel.

In this embodiment of the present disclosure, because a repetition quantity of a control channel is less than a repetition quantity of a data channel or a sending start time of a control channel is equal to a sending start time of a data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, after the control channel is completely sent, the data channel may be sent according to preset transmit power of UE in order to reduce the repetition quantity of the data channel, thereby reducing transmit power.

Embodiment 6

Figure 6:
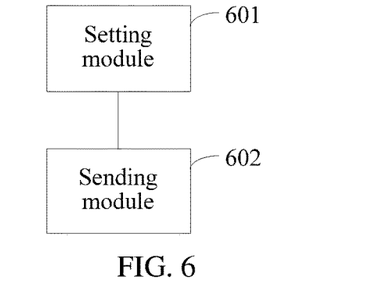
FIG. 6 is a schematic structural diagram of a channel sending apparatus according to Embodiment 6 of the prevent disclosure.

Referring to FIG. 6, this embodiment of the present disclosure provides a channel sending apparatus, including a setting module 601 configured to separately set a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel, and a sending module 602 configured to send the control channel according to the repetition quantity and the sending start time of the control channel, and send the data channel according to the repetition quantity and the sending start time of the data channel.

The repetition quantity of the control channel is less than the repetition quantity of the data channel, and the sending start time of the control channel is equal to the sending start time of the data channel.

The setting module 601 is configured to send the control channel according to preset transmit power of the control channel and the repetition quantity of the control channel at the sending start time of the control channel, and send the data channel according to preset transmit power of the data channel and the repetition quantity of the control channel.

Further, the setting module 601 is further configured to send the data channel according to a remaining repetition quantity of the data channel and the preset transmit power of the data channel after completely sending the control channel, where the remaining repetition quantity of the data channel is equal to a difference value between the repetition quantity of the data channel and the repetition quantity of the control channel, or send the data channel according to the remaining repetition quantity of the data channel and preset transmit power of UE after completely sending the control channel, where the preset transmit power of the UE is equal to a sum of the preset transmit power of the data channel and the preset transmit power of the control channel.

The sending start time of the control channel is earlier than the sending start time of the data channel.

The sending module 602 is configured to send the control channel according to preset transmit power of the control channel and the repetition quantity of the control channel at the sending start time of the control channel, and send the data channel according to preset transmit power of the data channel and the repetition quantity of the data channel at the sending start time of the data channel.

A time difference between the sending start time of the control channel and the sending start time of the data channel is greater than or equal to the repetition quantity of TTIs of the control channel.

The sending start time of the control channel is earlier than the sending start time of the data channel, and the time difference between the sending start time of the control channel and the sending start time of the data channel is greater than or equal to the repetition quantity of TTIs of the control channel.

Optionally, the sending module 602 is configured to send the control channel according to the preset transmit power of the UE and the repetition quantity of the control channel at the sending start time of the control channel, and send the data channel according to the preset transmit power of the UE and the repetition quantity of the data channel at the sending start time of the data channel.

In this embodiment of the present disclosure, because a repetition quantity of a control channel is less than a repetition quantity of a data channel or a sending start time of a control channel is equal to a sending start time of a data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, after the control channel is completely sent, the data channel may be sent according to preset transmit power of UE in order to reduce the repetition quantity of the data channel, thereby reducing transmit power.

Embodiment 7

Figure 7:
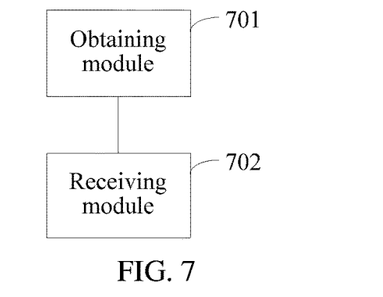
FIG. 7 is a schematic structural diagram of a channel receiving apparatus according to Embodiment 7 of the prevent disclosure.

Referring to FIG. 7, this embodiment of the present disclosure provides a channel receiving apparatus, including an obtaining module 701 configured to obtain a repetition quantity and a receiving start time of a control channel, and a repetition quantity and a receiving start time of a data channel, where the repetition quantity of the control channel is less than the repetition quantity of the data channel or the receiving start time of the control channel is earlier than the receiving start time of the data channel, and a receiving module 702 configured to receive the control channel according to the repetition quantity and the receiving start time of the control channel, and receive the data channel according to the repetition quantity and the receiving start time of the data channel.

A time difference between the receiving start time of the control channel and the receiving start time of the data channel is greater than or equal to the repetition quantity of TTIs of the control channel.

Embodiment 8

Figure 8:
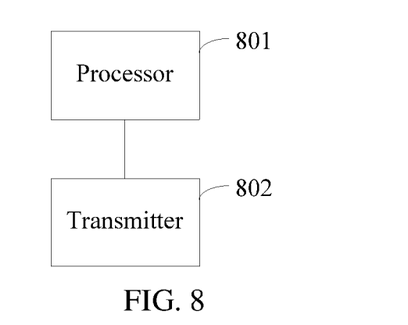
FIG. 8 is a schematic structural diagram of a transmit end according to Embodiment 8 of the present disclosure.

Referring to FIG. 8, this embodiment of the present disclosure provides a transmit end, including a processor 801 configured to separately set a repetition quantity and a sending start time of a control channel, and a repetition quantity and a sending start time of a data channel, where the repetition quantity of the control channel is less than the repetition quantity of the data channel or the sending start time of the control channel is earlier than the sending start time of the data channel, and a transmitter 802 configured to send the control channel according to the repetition quantity and the sending start time of the control channel, and send the data channel according to the repetition quantity and the sending start time of the data channel.

The repetition quantity of the control channel is less than the repetition quantity of the data channel, and the sending start time of the control channel is equal to the sending start time of the data channel.

The transmitter 802 is configured to send the control channel according to preset transmit power of the control channel and the repetition quantity of the control channel, and send the data channel according to preset transmit power of the data channel and the repetition quantity of the control channel at the sending start time of the control channel.

The transmitter 802 is further configured to send the data channel according to a remaining repetition quantity of the data channel and the preset transmit power of the data channel after completely sending the control channel, where the remaining repetition quantity of the data channel is equal to a difference value between the repetition quantity of the data channel and the repetition quantity of the control channel, or the transmitter 802 is further configured to send the data channel according to the remaining repetition quantity of the data channel and preset transmit power of UE after completely sending the control channel, where the preset transmit power of the UE is equal to a sum of the preset transmit power of the data channel and the preset transmit power of the control channel.

The sending start time of the control channel is earlier than the sending start time of the data channel.

The transmitter 802 is configured to send the control channel according to the preset transmit power of the control channel and the repetition quantity of the control channel at the sending start time of the control channel, and send the data channel according to the preset transmit power of the data channel and the repetition quantity of the data channel at the sending start time of the data channel.

A time difference between the sending start time of the control channel and the sending start time of the data channel is greater than or equal to the repetition quantity of TTIs of the control channel.

The sending start time of the control channel is earlier than the sending start time of the data channel, and the time difference between the sending start time of the control channel and the sending start time of the data channel is greater than or equal to the repetition quantity of TTIs of the control channel.

The transmitter 802 is configured to send the control channel according to the preset transmit power of the UE and the repetition quantity of the control channel at the sending start time of the control channel, and send the data channel according to the preset transmit power of the UE and the repetition quantity of the data channel at the sending start time of the data channel.

In this embodiment of the present disclosure, because a repetition quantity of a control channel is less than a repetition quantity of a data channel or a sending start time of a control channel is equal to a sending start time of a data channel, the control channel may be completely sent before the data channel is completely sent, and a receive end may first complete receiving the control channel and first demodulate the control channel. Control information is already obtained by means of demodulation when the data channel is demodulated, the demodulation of the control channel does not need to be waited for, and the demodulation of the data channel is directly performed in order to resolve a problem of a lag of the data channel demodulation. In addition, after the control channel is completely sent, the data channel may be sent according to preset transmit power of UE in order to reduce the repetition quantity of the data channel, thereby reducing transmit power.

Embodiment 9

Figure 9:
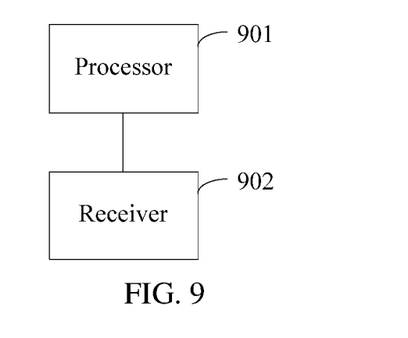
FIG. 9 is a schematic structural diagram of a receive end according to Embodiment 9 of the present disclosure.

Referring to FIG. 9, this embodiment of the present disclosure provides a receive end, including a processor 901 configured to obtain a repetition quantity and a receiving start time of a control channel, and a repetition quantity and a receiving start time of a data channel, where the repetition quantity of the control channel is less than the repetition quantity of the data channel or the receiving start time of the control channel is earlier than the receiving start time of the data channel, and a receiver 902 configured to receive the control channel according to the repetition quantity and the receiving start time of the control channel, and receive the data channel according to the repetition quantity and the receiving start time of the data channel.

A time difference between the receiving start time of the control channel and the receiving start time of the data channel is greater than or equal to the repetition quantity of TTIs of the control channel.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely example embodiments of the present disclosure, but are not intended to limit the present disclosure. Any modification, equivalent replacement, and improvement made without departing from the principle of the present disclosure shall fall within the protection scope of the present disclosure.

What is claimed is:

1. A method, comprising:
    setting a repetition quantity of a control channel and a sending start time of the control channel;
    setting a repetition quantity of a data channel and a sending start time of the data channel, wherein either the repetition quantity of the control channel is less than the repetition quantity of the data channel or the sending start time of the control channel is earlier than the sending start time of the data channel, and wherein when the repetition quantity of the control channel is less than the repetition quantity of the data channel, the sending start time of the control channel is equal to the sending start time of the data channel;
    sending the control channel according to a preset transmit power of the control channel and the repetition quantity of the control channel at the sending start time of the control channel; and sending the data channel according to a preset transmit power of the data channel and the repetition quantity of the control channel at the sending start time of the data channel.

2. The method of claim 1, wherein sending the data channel comprises sending the data channel according to a remaining repetition quantity of the data channel and the preset transmit power of the data channel after the control channel is completely sent, and wherein the remaining repetition quantity of the data channel is equal to a difference value between the repetition quantity of the data channel and the repetition quantity of the control channel.

3. The method of claim 1, wherein sending the data channel comprises sending the data channel according to a remaining repetition quantity of the data channel and preset transmit power of user equipment (UE) after the control channel is completely sent, and wherein the preset transmit power of the UE is equal to a sum of the preset transmit power of the data channel and the preset transmit power of the control channel.

4. The method of claim 1, wherein a time difference between the sending start time of the control channel and the sending start time of the data channel is greater than a repetition quantity of transmission time intervals (TTIs) of the control channel.

5. The method of claim 1, wherein a time difference between the sending start time of the control channel and the sending start time of the data channel is equal to a repetition quantity of transmission time intervals (TTIs) of the control channel.

6. The method of claim 1, wherein when the sending start time of the control channel is earlier than the sending start time of the data channel and when a time difference between the sending start time of the control channel and the sending start time of the data channel is greater than or equal to a repetition quantity of transmission time intervals (TTIs) of the control channel;
sending the control channel comprises sending the control channel according to preset transmit power of user equipment (UE), the preset transmit power of the control channel, and the repetition quantity of the control channel at the sending start time of the control channel; and
sending the data channel comprises sending the data channel according to the preset transmit power of the UE, the preset transmit power of the data channel, and the repetition quantity of the data channel at the sending start time of the data channel.

7. A method, comprising:
obtaining, by a receive end, a repetition quantity of a control channel and a receiving start time of the control channel;
obtaining, by the receive end, a repetition quantity of a data channel and a receiving start time of the data channel, wherein the repetition quantity of the control channel is less than the repetition quantity of the data channel, or the receiving start time of the control channel is earlier than the receiving start time of the data channel, and wherein a time difference between the receiving start time of the control channel and the receiving start time of the data channel is greater than or equal to a repetition quantity of transmission time intervals (TTIs) of the control channel;
receiving the control channel according to the repetition quantity and the receiving start time of the control channel; and receiving the data channel according to the repetition quantity and the receiving start time of the data channel.

8. An apparatus, comprising:
a processor configured to:
set a petition quantity of a control channel and a sending start time of the control channel; and
set a repetition quantity of a data channel and a sending start time of the data channel, wherein either the repetition quantity of the control channel is less than the repetition quantity of the data channel or the sending start time of the control channel is earlier than the sending start time of the data channel, and wherein when the repetition quantity of the control channel is less than the repetition quantity of the data channel, the sending start time of the control channel is equal to the sending start time of the data channel; and
a transmitter coupled to the processor and configured to:
send, at the sending start time of the control channel, the control channel according to a preset transmit power of the control channel and the repetition quantity of the control channel; and
send, the sending start time of the data channel, the data channel according to preset transmit power of the data channel and the repetition quantity of the control channel.

9. The apparatus of claim 8, wherein the transmitter is further configured to send the data channel according to a remaining repetition quantity of the data channel and the preset transmit power of the data channel after completely sending the control channel, and wherein the remaining repetition quantity of the data channel is equal to a difference value between the repetition quantity of the data channel and the repetition quantity of the control channel.

10. The apparatus of claim 8, wherein the transmitter is further configured to send the data channel according to a remaining repetition quantity of the data channel and preset transmit power of user equipment (UE) after completely sending the control channel, and wherein the preset transmit power of the UE is equal to a sum of the preset transmit power of the data channel and the preset transmit power of the control channel.

11. The apparatus of claim 8, wherein the repetition quantity of the control channel is less than the repetition quantity of the data channel, and wherein sending the control channel is completed before sending the data channel is completed.

12. The apparatus of claim 8, wherein the sending start time of the control channel is earlier than the sending start time of the data channel, and wherein sending the control channel is completed before sending the data channel is completed.

13. An apparatus, comprising:
a processor configured to:
set a repetition quantity of a control channel and a sending start time of the control channel; and
set a repetition quantity of a data channel and a sending start time of the data channel, wherein either the repetition quantity of the control channel is less than the repetition quantity of the data Channel or the sending start time of the control channel is earlier than the sending start time of the data channel; and
a transmitter coupled to the processor and configured to:
send the control channel according to the repetition quantity at the sending start time of the control channel; and send the data channel according to the repetition quantity and the sending start time of the data channel,
wherein when the sending start time of the control channel is earlier than the sending start time of the data channel:
the transmitter being configured to send the control channel comprises the transmitter being configured to send the control channel according to preset transmit power of the control channel and the repetition quantity of the control channel at the sending start time of the control channel; and
the transmitter being configured to send the data channel comprises the transmitter being configured to send the data channel according to preset transmit power of the data channel and the repetition quantity of the data channel at the sending start time of the data channel.

14. The apparatus of claim 13, wherein a time difference between the sending start time of the control channel and the sending start time of the data channel is greater than or equal to a repetition quantity of transmission time intervals (TTIs) of the control channel.

15. The apparatus of claim 13, wherein the repetition quantity of the control channel is less than the repetition quantity of the data channel, and wherein sending the control channel is completed before sending the data channel is completed.

16. The apparatus of claim 13, wherein the sending start time of the control channel is earlier than the sending start time of the data channel, and wherein sending the control channel is completed before sending the data channel is completed.

17. An apparatus, comprising:
a processor configured to:
set a repetition quantity of a control channel and a sending start time of the control channel; and
set a repetition quantity of a data channel and a sending start time of the data channel, wherein either the repetition quantity of the control channel is less than the repetition quantity of the data channel or the sending start time of the control channel is earlier than the sending, start time of the data channel; and
a transmitter coupled to the processor and configured to;
send the control channel according to the repetition quantity at the sending start time of the control channel; and
send the data channel according to the repetition quantity and the sending start time of the data channel,
wherein when the sending start time of the control channel is earlier than the sending start time of the data channel and when a time difference between the sending start time of the control channel and the sending start time of the data channel is greater than or equal to a repetition quantity of transmission time intervals (TTIs) of the control channel:
the transmitter being configured to send the control channel comprises the transmitter being configured to send the control channel according to preset transmit power of user equipment (UE) and the repetition quantity of the control channel at the sending start time of the control channel; and
the transmitter being configured to send the data channel comprises the transmitter being configured to send the data channel according to the preset transmit power of the UE and the repetition quantity of the data channel at the sending start time of the data channel.

18. The apparatus of claim 17, wherein the repetition quantity of the control channel is less than the repetition quantity of the data channel, and wherein sending the control channel is completed before sending the data channel is completed.

19. The apparatus of claim 17, wherein the sending start time of the control channel is earlier than the sending start time of the data channel, and wherein sending the control channel is completed before sending the data channel is completed.

20. An apparatus, comprising:
a processor configured to
obtain a repetition quantity of a control channel and a receiving start time of the control channel;
obtain a repetition quantity of a data channel and a receiving start time of the data channel, wherein either the repetition quantity of the control channel is less than the repetition quantity of the data channel or the receiving start time of the control channel is earlier than the receiving start time of the data channel, and wherein a time difference between the receiving start time of the control channel and the receiving start time of the data channel is greater than or equal to a repetition quantity of transmission time intervals (TTIs) of the control channel; and
a receiver coupled to the processor and configured to:
receive the control channel according to the repetition quantity and the receiving start time of the control channel; and
receive the data channel according to the repetition quantity and the receiving start time of the data channel.

* * * * *